United States Patent
Kulaga et al.

(10) Patent No.: US 12,155,627 B2
(45) Date of Patent: Nov. 26, 2024

(54) MANAGING CORPORATE FIREWALLS AND NETWORK ISOLATION FOR EDR

(71) Applicant: Acronis International GmbH, Schaffhausen (CH)

(72) Inventors: Andrey Kulaga, Istanbul (TR); Anastasia Avsynannikova, Istanbul (TR); Roman Vasyutin, Istanbul (TR); Nikolay Grebennikov, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 193 days.

(21) Appl. No.: 17/449,613

(22) Filed: Sep. 30, 2021

(65) Prior Publication Data

US 2023/0099259 A1    Mar. 30, 2023

(51) Int. Cl.
   H04L 9/40    (2022.01)
(52) U.S. Cl.
   CPC ........ *H04L 63/0263* (2013.01); *H04L 63/104* (2013.01); *H04L 63/105* (2013.01); *H04L 63/20* (2013.01)
(58) Field of Classification Search
   CPC ....... H04L 63/1416; G06N 5/04; G06N 20/00
   See application file for complete search history.

(56) References Cited

U.S. PATENT DOCUMENTS

| | | | |
|---|---|---|---|
| 8,099,775 B2 | 1/2012 | Lee | |
| 10,122,760 B2 | 11/2018 | Terrill et al. | |
| 10,623,445 B2 | 4/2020 | Breton et al. | |
| 10,778,645 B2 | 9/2020 | Kliger et al. | |
| 11,327,898 B2 | 5/2022 | Jain et al. | |
| 2005/0138416 A1 | 6/2005 | Qian et al. | |
| 2012/0066765 A1* | 3/2012 | O'Brien | G06F 21/554 726/23 |
| 2016/0323318 A1* | 11/2016 | Terrill | H04L 63/1441 |
| 2018/0084000 A1* | 3/2018 | Baukes | H04L 63/1408 |
| 2018/0375831 A1* | 12/2018 | Kliger | H04L 63/0263 |
| 2019/0068617 A1* | 2/2019 | Coleman | H04L 63/0876 |

(Continued)

FOREIGN PATENT DOCUMENTS

| | | |
|---|---|---|
| AU | 5486800 A | 1/2001 |
| CN | 101582900 B | 6/2012 |

(Continued)

OTHER PUBLICATIONS

Mtibaa A, Harras K, Alnuweiri H. Friend or foe? Detecting and isolating malicious nodes in mobile edge computing platforms. In2015 IEEE 7th International Conference on Cloud Computing Technology and Science (CloudCom) Nov. 30, 2015 (pp. 42-49). IEEE. (Year: 2015).*

*Primary Examiner* — James R Turchen
(74) *Attorney, Agent, or Firm* — ESPE Legal Consultancy FZ-LLC

(57) ABSTRACT

A system and method for firewall policy control in a system comprising endpoints, including functionality for isolating network elements on endpoints under management. An endpoint management agent cooperates with a remote management service to carry out policy management and synchronization, implement isolation mode when required, and perform related supporting tasks.

17 Claims, 16 Drawing Sheets

(56) References Cited

U.S. PATENT DOCUMENTS

| | | | |
|---|---|---|---|
| 2019/0190956 A1* | 6/2019 | Breton | ............... H04L 41/0894 |
| 2021/0004333 A1* | 1/2021 | Jain | .................... H04L 63/0281 |
| 2021/0406109 A1 | 12/2021 | Kulaga et al. | |

FOREIGN PATENT DOCUMENTS

| | | | |
|---|---|---|---|
| EP | 1143665 B1 | 1/2007 | |
| IN | 741DE2004 A | 1/2006 | |
| IN | 5976CHN2009 A | 2/2010 | |
| JP | 3545303 B2 | 7/2004 | |
| KR | 100904557 B1 | 6/2009 | |

* cited by examiner

MANAGING CORPORATE FIREWALLS AND NETWORK ISOLATION FOR EDR

TECHNICAL FIELD

The invention pertains to the use and management of firewalls and deployment of network isolation techniques in a corporate computer network environment.

BACKGROUND

Firewalls are commonly used to provide security for networked computing environments. Each firewall comprises certain policies that control access for a particular network element, such as an individual computer or server. In corporate networks, implementing these firewall policies can be difficult because of the number of endpoints under management. System performance and security may degrade as more and more firewall rules and policies are deployed on a system.

In a networking environment with multiple endpoints and multiple firewalls, it can be hard to monitor whether a user, user group, or machine has been given permissions that create unreasonably high risks for the network. These risks include vulnerabilities for individual endpoints and the network as a whole.

Lack of controls also compromise the networks in other ways. For example, when a machine in the network becomes infected with malware or otherwise compromised, isolation and recovery of that machine takes longer because decentralized policies and rules are difficult to deploy quickly, resulting in increased system vulnerability. Every minute that a machine is vulnerable imposes a risk on the entire network. There is a need for a network-based implementation of firewall control and systemwide services that minimizes overhead and reduces isolation and recovery times for infected machines.

SUMMARY

In a computer network with a firewall, different policies and firewall settings are employed. These settings are specific to endpoints, specific to users at the user level, or specific to users at the group level.

A firewall management component provides centralized management for the firewall types that protect endpoints in the network. One aspect of the firewall management component is a firewall management agent installed on each endpoint under management. These endpoints comprise computers and servers. The firewall management agents manage corporate firewalls and endpoint firewalls on these computers and servers, and in general on any host within the network.

A second aspect of the firewall management component is a firewall management service. This service operates on a central server and collects and manages current policies. The firewall management service also synchronizes policies and launches and configures isolation mode. Application settings, firewall authorizations and configurations are controlled by the firewall management service.

The administrator enters a global structure, the same for each firewall type, that comprises a policy or part of policy to be changed or deployed. The firewall management service stores the policy and associates it with specified user, user group, or machine. A firewall management component performs direct and reverse policy synchronization between server and agents. Another firewall management component supports a hierarchy of policies.

A firewall management agent deploys a required policy. In case of a firewall applied at the software level, a wide policy can be applied. For a corporate firewall, a narrower policy is chosen.

An administrator launches network machine isolation if a network machine becomes infected. Isolation mode is configured to leave some services enabled, such as those services required to cure the machine. Isolation policy is the highest priority policy. After curing the machine, a security officer can disable network isolation and plugin with completely recovered endpoint firewall policy.

Actual policy configuration is determined from the last saved direct and reverse synchronizations. Current active policies are converted to a unified policy representation format.

A firewall management component performs a dynamic scan of required IP addresses. If the addresses change, the firewall management component rewrites firewall rules that include blocked or allowed IP addresses.

DETAILED DESCRIPTION

Figure 1:
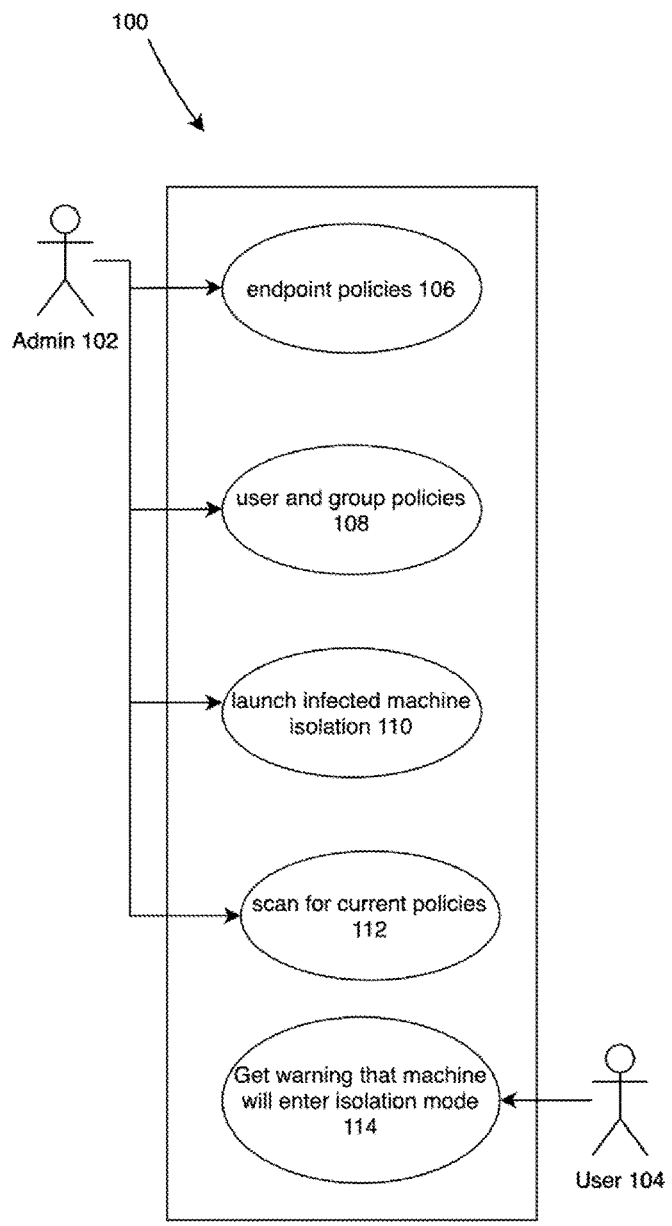
FIG. 1 shows the relationship between the system administrator and the end user.

A network with a firewall management component is implemented to provide centralized management for firewall types that protect endpoints in the network. The firewall management component comprises a firewall management agent ("management agent") installed on each endpoint under management, such as computers and servers. These management agents manage firewalls on these endpoint computers and servers. The firewall management component further comprises a firewall management service ("management service"). This service operates on a central server and collects and manages current policies. The management service also synchronizes policies and launches and configures isolation mode. Application settings, firewall authorizations and configurations are controlled by the firewall management service.

The management agent is a computer program that acts on behalf of users or other programs in an agency relationship. The agency relationship means that the agent has the authority to take actions—or not take actions—depending on circumstances. The management service is a set of software functionalities. For example, a service may retrieve information or execute a set of instructions. A service has clients that can use it for different purposes. Services also have policies that control how the service is used. These policies are typically based on the identity of the client requesting the service.

Policies and firewall settings apply at different levels within the network. For example, there are policies and settings specific to endpoints, users, and user groups. The global structure is created when policies are established for firewall types within the network. The management service stores policies and associates them with specific users The firewall management component performs direct and reverse policy synchronization between a central server and management agents. Synchronization takes place between the management agent and the system backend. The backend refers generally to services and data not directly accessible to end users.

Firewall policy changes can be made outside the management service, including local policy changes and group policy changes. The management agent itself performs policy collection and sync. This collection and sync happens at intervals based on, for example, time or Windows Event Tracing. Event Tracing for Windows (ETW) runs the management agent side and detects appropriate events from a Microsoft-Windows-DNS-Client provider.

When a change in firewall configuration is detected or effected by sync, the management agent initializes a communication protocol with the server. The protocol comprises retrieving the current policy and beginning interaction with the backend using an application program interface, such as REST API. The backend retrieves the last stored policy from a backend policy database and compares it with the current policy. This comparison of backend rules and local rules presents several typical cases. If the policies do not match, the backend calculates differences and sends them to the management agent using a structure comprising rules to change, rules to delete, and rules to add. If the comparison detects new local changes that contradict a backend priority policy, the backend configures new rules and sends them to the agent using a structure comprising rules to change, rules to delete, and rules to add. In these cases, the management agent saves the new policy configuration and applies any changes to the endpoint under management.

Reverse synchronization takes place when the backend initiates a request to the management agent for current policies. This can be done, for example, by using an application program interface, such as REST API. The management agent retrieves a current policy and sends it to the backend. If the policies do not match, the backend policy database is updated. The backend calculates differences and if local changes contradict a higher priority policy, then new corrective rules are configured by the backend, stored in the backend policy database, and sent to the management agent with a structure comprising rules to change, rules to delete, and rules to add. If in the backend database there are policy updates that have not been applied on the management-agent side, these will be treated as differences. The backend will send corrective rules to be sent to the management agent using a structure comprising rules to change, rules to delete, and rules to add. The management agent then applies the policy changes and the management agent and the central server record the results of the reverse synchronization.

In some cases, backend or local rules may contradict centralized management configurations. For example, in Windows environments there are Group Policy configurations collectively known as a Group Policy Object (GPO). A common difference calculation algorithm is used to address this situation. The algorithm starts when the management agent sends a current policy to the central server. The central server retrieves the most recent stored policy from the backend policy database and compares it with the management agent's data. The first step is to identify differences. This process is carried out using unique identifiers. Each firewall setting has a unique identifier, for example, the registry branch where the firewall setting is stored. On the central server side and on the management agent's registry, each firewall setting is stored with its unique identifier. When a new policy is applied by the central server, the modified parameter is stored with a temporary unique identifier. After making the modification, the management agent communicates to the central server a permanent unique identifier of the modified parameter. The central server then changes the temporary unique identifier to a permanent unique identifier. The backend compares settings stored before modification with settings after modification. Corresponding settings with the same unique identifiers are compared. The backend detects new parameters by the new unique identifiers. New and changed parameters are considered differences by the backend. The backend prepares a detailed difference description, for example, using JavaScript Object Notation (JSON). This description comprises rules for the agent to delete, add, or change. The differences are then communicated to the management agent. If merge policy conflicts arise, such as when a lower priority rule contradicts a higher priority rule, the backend creates a set of policy changes to fix the conflict. If the conflict results from a change made by a local administrator, then the backend's policy changes will take precedence. If the conflict results from a change made by the backend administrator, the backend policy change is disabled.

The process described above also applies to reverse synchronization. The difference is that the synchronization is initiated by the central server instead of the management agent.

The system described preferably includes a hierarchy of policies. These policies, ranked from highest to lowest, include an isolation policy, an active directory group policy, an endpoint policy, and local policies. For example, in a Windows environment, firewall rules can be configured by either a Windows firewall or a third-party firewall. In the case of a Windows Firewall with Advanced Security, firewall rules can be deployed by the local administrator, by the firewall management component, or the GPO. In the case of third-party firewalls, rules can be deployed by the firewall management component or by an administrator. If the firewall management component simply applies all rules, the resulting policy will be the sum of existing rules, following the merge rules established in each firewall, and could produce unexpected results. If only priorities are used for resolution, the ultimate policy will be obscured. As a solution, the main firewall policy can be determined and applied, with changes controlled accordingly. If an appropriate rule is missing from the main firewall policy, the merge conflict will be resolved by turning to the priority of different policy sources. In an embodiment of the invention, differences are calculated continuously for each kind of firewall rule when a new policy is applied. An example of a new policy would be when an administrator allows all outbound connections. An example of policy conflict would be if an administrator attempts to allow outbound connection to port 234 but on a third-party firewall this connection is blocked. The main firewall policy is checked first. If there is no appropriate rule in the main firewall policy, highest priority rule will be enabled, in accordance with a predetermined rule priority.

The management agent deploys firewall policies selectively. For example, firewalls that work at the software level can be assigned more inclusive policies. For firewalls that protect servers and corporate firewalls, narrower policies can be set.

When a network machine gets infected with malware, an administrator starts the network-machine-isolation process. The backend marks the machine as isolated and sends a command to all firewalls prohibiting all traffic to and from the infected machine, with certain exceptions. For example, exceptions can be made for Remote Desktop Protocol (RDP), backend access, and specific ports. This isolation policy is then deployed to the affected endpoint.

The isolation mode algorithm generally comprises the following steps. All current firewall rules and settings remain unchanged. The firewall management component receives static IP addresses corresponding to services and exceptions that must be available to the isolated machine. Then the firewall management component creates a set of restrictive rules. For example, for given IP addresses in a given range, restrictive rules are configured with exclusions for specific IP addresses that require access to an infected machine even in isolation mode. For excluded addresses, there are no rules to configure.

An isolation policy is the highest priority policy and it overrides all other policies that conflict with it.

In an embodiment, an administrator starts a scan for current policies. The central server provides the administrator with actual policy configurations saved from the most recent direct and reverse synchronizations. Current active policies are converted to a unified policy representation format. The form of the policies can be narrow or broad, but all are represented in the same format. Unused fields are set to default or empty values. After conversion to a unified format, a report with results is available to the administrator.

In a further embodiment, an isolation mode algorithm includes a step where the firewall management component performs a dynamic scan of required IP addresses. If IP addresses have changed, the firewall management component rewrites rules according to the new configuration.

In an exemplary embodiment, the management service and management agent each comprise the following components: policy storage, firewall manager, isolation mode manager, and sync manager.

FIG. 1 shows the respective roles 100 of a system administrator 102 and representative user 104 within the network. Administrators use the system to create or change endpoint policies 106, user and group policies 108, launch infected machine isolation 110, and scan for current policies 112. When a machine enters isolation mode, user 104 gets warning 114.

Figure 2A:
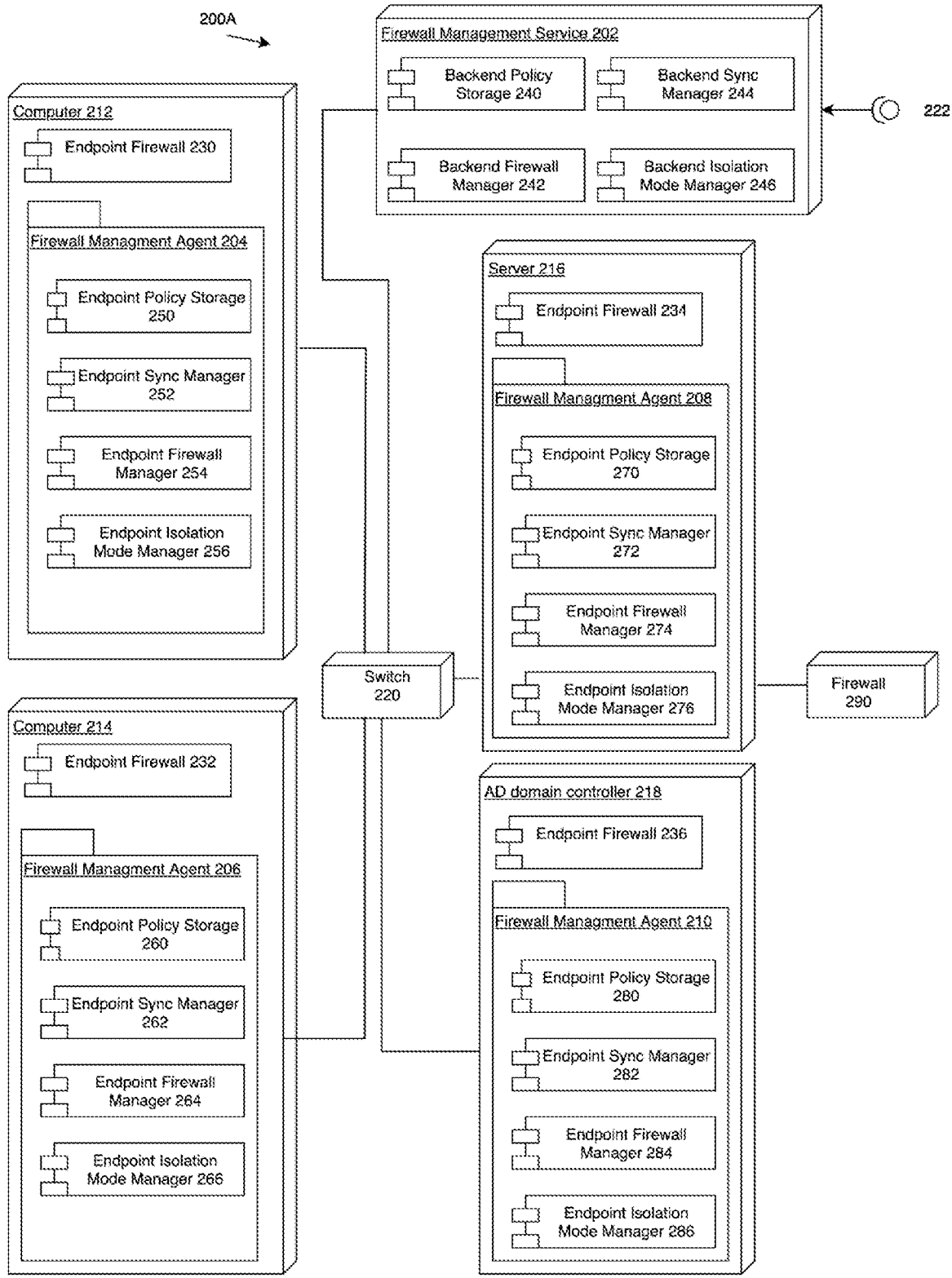
FIGS. 2A and 2B show a deployment diagram for an embodiment of the invention.
Figure 2B:
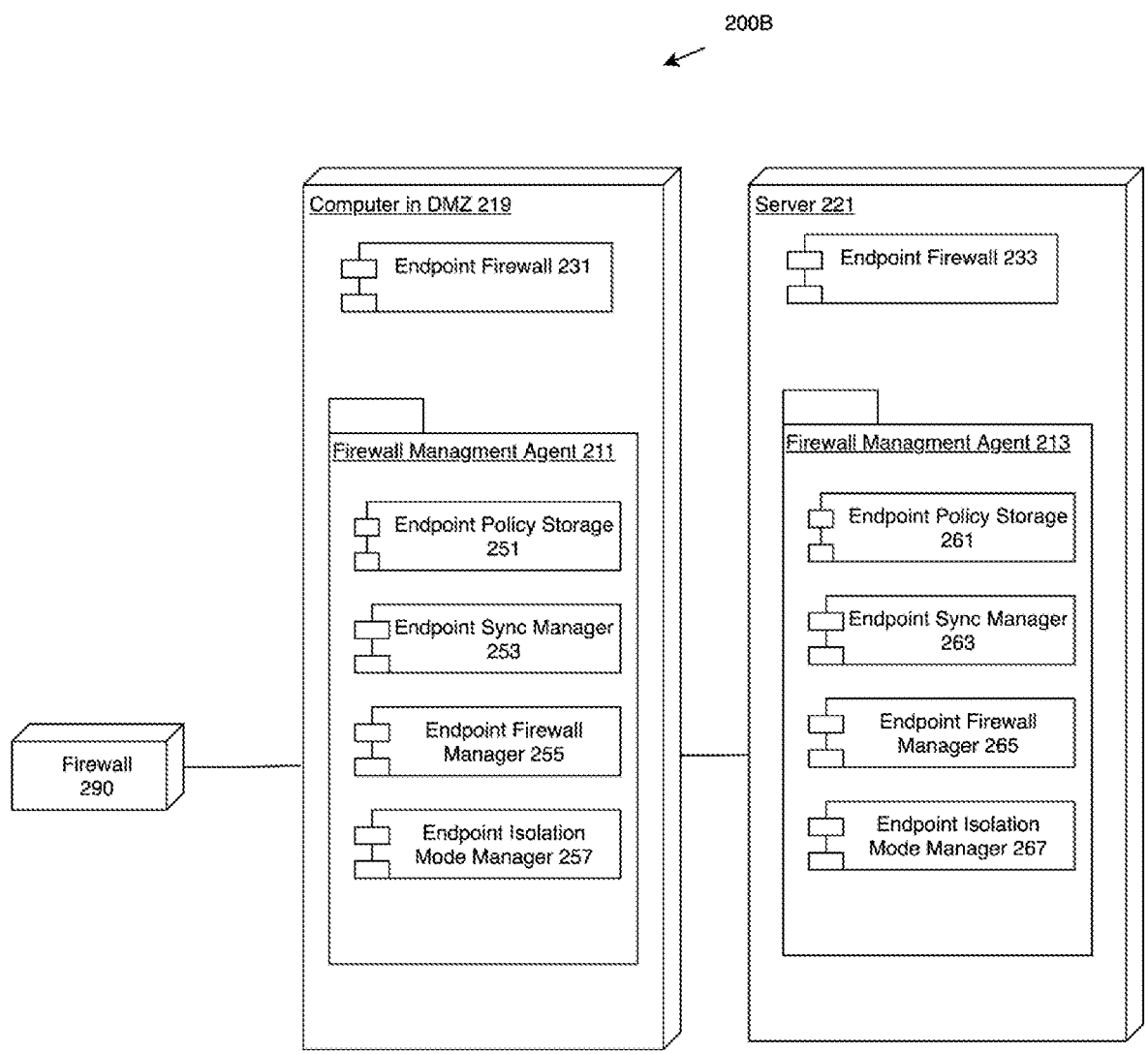

FIGS. 2A and 2B show an exemplary deployment. Firewall Management Service 202 ("Service") communicates with Firewall Management Agents ("Agent") 204, 206, 208, and 210. Agents 204, 206, 208, and 210 are installed on system endpoints: computer 212, computer 214, server 216, and Active Directory (AD) domain controller 218. The AD domain controller is a server that answers requests for authentication and verifies users. Users and computers are organized by domains in the network. Traffic between the Agents on the endpoints and the Service is routed via switch 220. The Service is controlled via API 22, which may be implemented as a console or graphical user interface.

The endpoints are protected by firewalls 230, 232, 234, and 236. The Agents at each endpoint comprise the following components: Endpoint Policy Storage 250, 260, 270, and 280; Endpoint Sync Manager 252, 262, 272, and 282; Endpoint Firewall Manager 254, 264, 274, and 284; and Endpoint Isolation Mode Manager 256, 266, 276, and 286.

The Service 202 comprises the following components: Backend Policy Storage 240, Backend Firewall Manager 242, Backend Sync Manager 244, and Backend Isolation Mode Manager 246.

In FIG. 2A, server 216 is connected to firewall 290. Deployment 200B of firewall 290 is shown in FIG. 2B. Behind firewall 290 are endpoints: computer in DMZ 219 and server 221. DMZ means a security zone that contains and exposes external-facing services to an untrusted, usually larger, network such as the Internet. Installed on these endpoints are Agents 211 and 213. The Agents comprise the following components: Endpoint Policy Storage 251 and 261; Endpoint Sync Manager 253 and 263; Endpoint Firewall Manager 255 and 265; and Endpoint Isolation Mode Manager 257 and 267.

Figure 3:
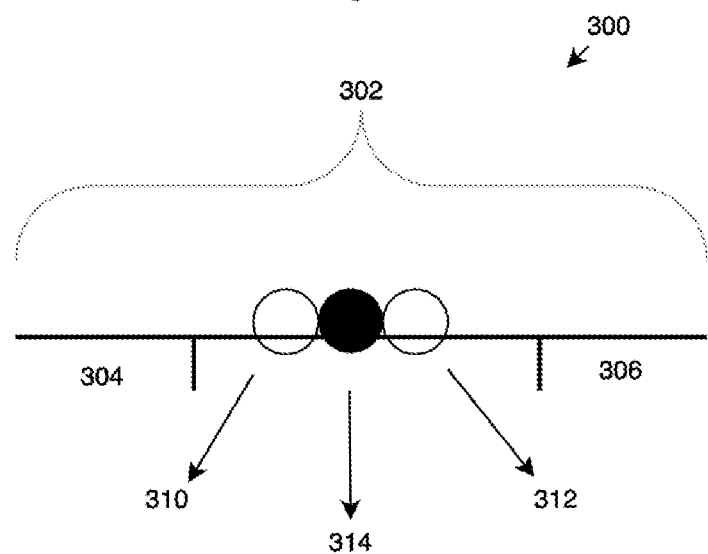
FIG. 3 shows an example of how rules are configured for two ranges.

FIG. 3 shows an example of rule creation 300 for the IP addresses in the managed network. Entire range 302 of IP addresses is divided into ranges, for example first range 304 and second range 306. Between these ranges are addresses 310, 312, and 314. In an embodiment, isolation mode has been entered and all addresses in range 302 are blocked. Address 314 is excluded from the rule and given access even in isolation mode. Address 310, 312 are the addresses immediately before and after the excluded address.

Figure 4:
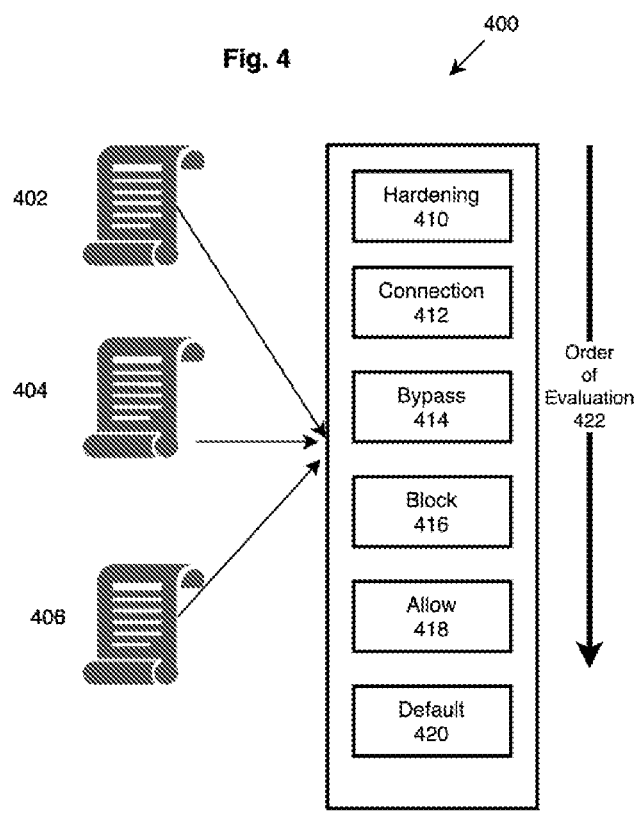
FIG. 4 shows an example of the priority of rules for Windows firewall.

FIG. 4 shows an example 400 of priority rules. Given group policies 402, 404, and 406, different rules sets are available in order of evaluation, from highest to lowest priority. These rules include hardening 410, connection 412, bypass 414, block 416, allow 418, and default 420. The order of evaluation 422 proceeds from top to bottom.

In an embodiment, rules 410 comprise Windows Service Hardening. This type of built-in rule restricts services from establishing connections in ways that depart from initial design decisions. For example, service restrictions are configured so that Windows services can communicate only in specified ways, such as allowing traffic only on a specified port.

Connection security rules 412 defines how and when computers authenticate using Internet Protocol Security (IPsec), a secure network protocol suite. IPsec authenticates and encrypts data packets to provide secure encrypted communication between two computers over an Internet Protocol (IP) network. A connection security rule can also require encryption for data privacy. Connection security rules are typically used to establish server and domain isolation, as well as to enforce Network Access Protection (NAP) policies. NAP is a client health policy creation, enforcement, and remediation technology. With NAP, system administrators can establish and automatically enforce health policies, which can include software requirements, security update requirements, and other settings. Client computers that are not in compliance with health policy can be provided restricted network access until their configuration is updated and brought into compliance with NAP policy.

Authenticated bypass rules 414 allow the connection of specified computers or users even when inbound firewall rules would block the traffic. This rule typically requires that network traffic from the authorized computers is authenticated by IPsec so identity can be confirmed.

Block rules 416 stop specific incoming or outgoing traffic. "Allow" rules 418 permit a specific type of incoming or outgoing traffic. Block rules 416 are evaluated before allow rules 418 and therefore take precedence. Thus, network traffic will be blocked if it matches both an active block rule and an active allow rule.

Default rules 420 define the action that takes place when a connection does not match any other rule. For example, a default rule for inbound traffic is to block connections while a default rule for outbound default is to allow connections. In a Windows environment, default rules can be changed on a per-profile basis in Windows Firewall Properties. Each firewall profile may be configured with respect to local firewall rules and local connection security rules. These settings define whether or not locally defined rules are applied. The default configuration is that local firewall rules are applied. If the default rule is diabled, then locally created rules will have no effect, whether created by an administrator or a program. In case of enabling local firewall rules, the result rules are cumulative.

Figure 5:
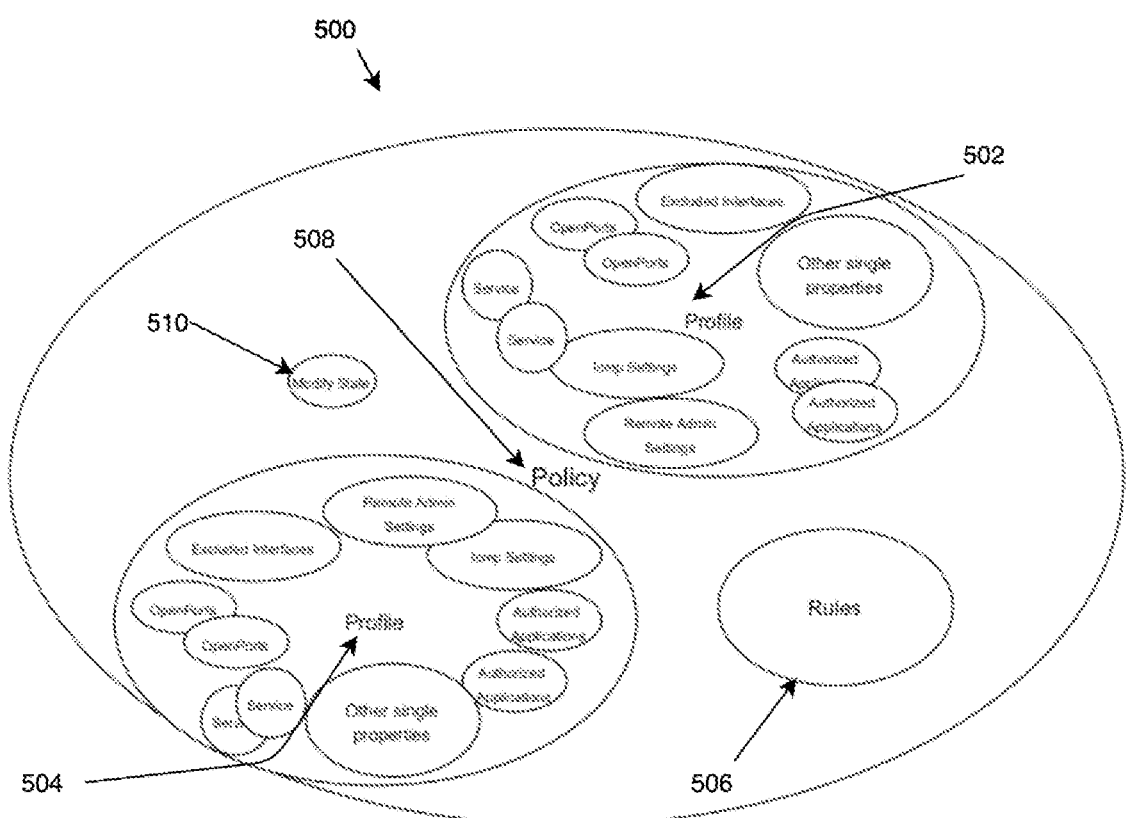
FIG. 5 shows an example of how Windows Firewall Settings are structured.

FIG. 5 shows firewall setting structure 500 with profiles 502 and 504 in relation to Rules 506, Policy 508, and Modify State 510. Policy 508 is retrieved from a database to determine the current applicable policy with respect to profiles 502 and 504. Rules 506 are checked to determine whether to make state modifications 510.

Figure 6:
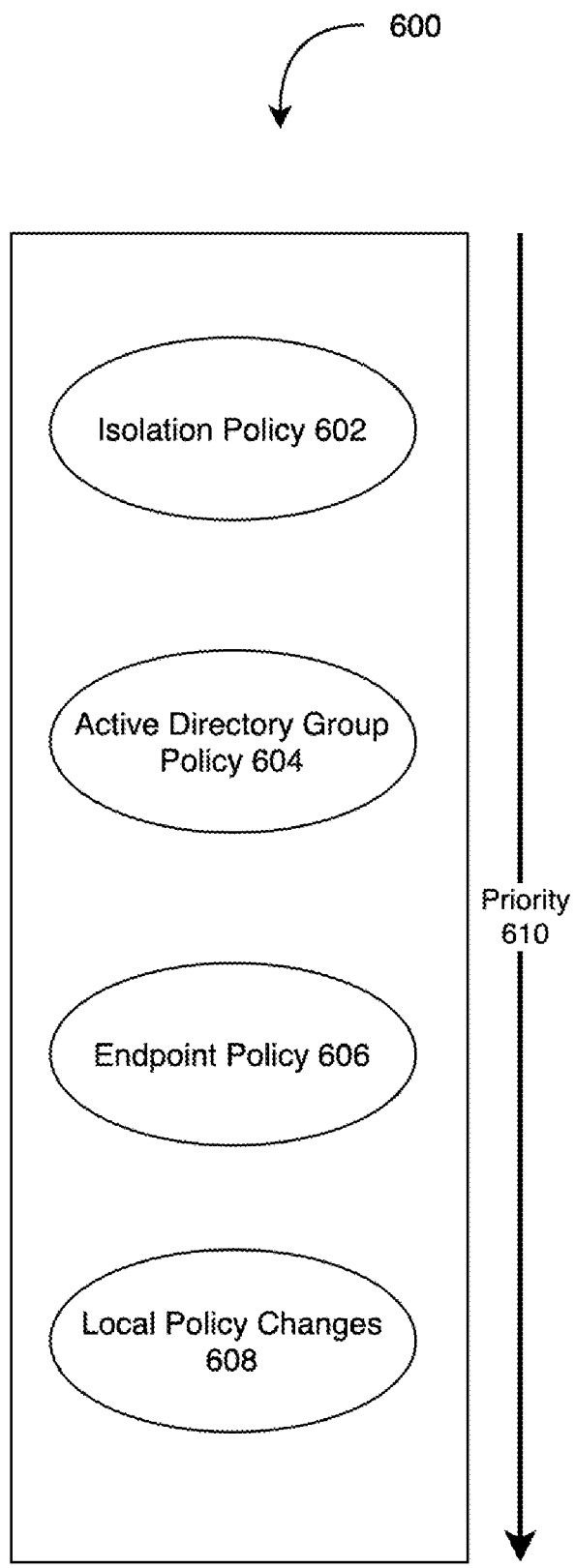
FIG. 6 shows a hierarchy of policies for conflict resolution.

FIG. 6 shows an exemplary policy hierarchy 600 including isolation policy 602, AD group policy 604, Endpoint policy 606, and Local Policy Changes 608. The policies are ranked in priority 610 from top to bottom.

Figure 7:
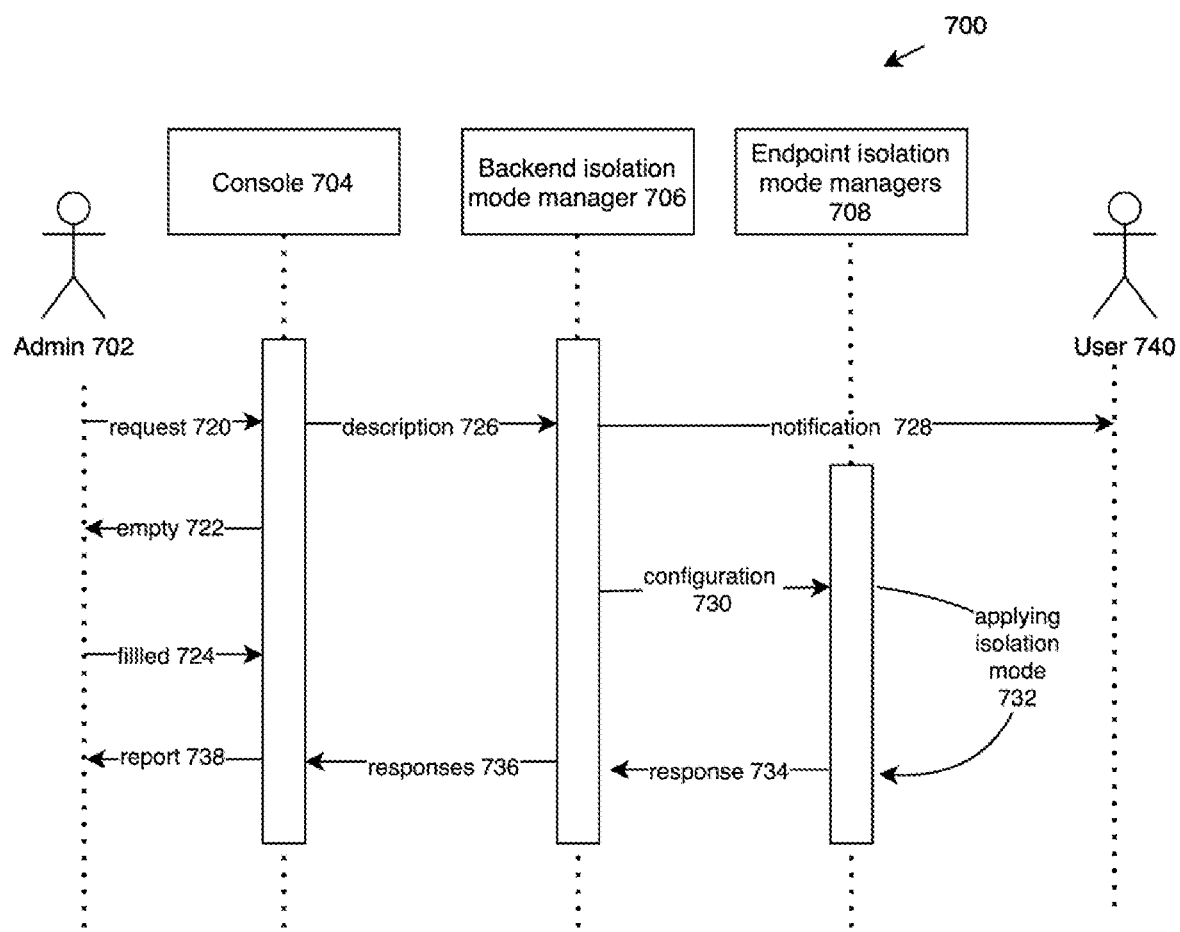
FIG. 7 shows an example of isolation mode.

FIG. 7 shows isolation mode 700 implemented by Admin 702 for User 740. The components used include console 704, backend isolation mode manager 706 and endpoint isolation mode managers 708. Admin 702 enters request 720 for isolation mode at console 704. Console 704 returns empty exceptions description 722. Admin 702 enters filled exceptions description 724 (if any) and the isolation description 726 is conveyed to backend isolation mode manager 706, which in turn sends notification 728 that isolation mode is being applied. Backend isolation mode manager 708 sends isolation configuration 730 to endpoint isolation mode managers 708. These mode managers apply isolation mode 732 locally and send responses and results to backend isolation mode manager 706. These responses are conveyed back to console 704 as processed responses and Admin 702 receives a corresponding report 738.

Figure 8:
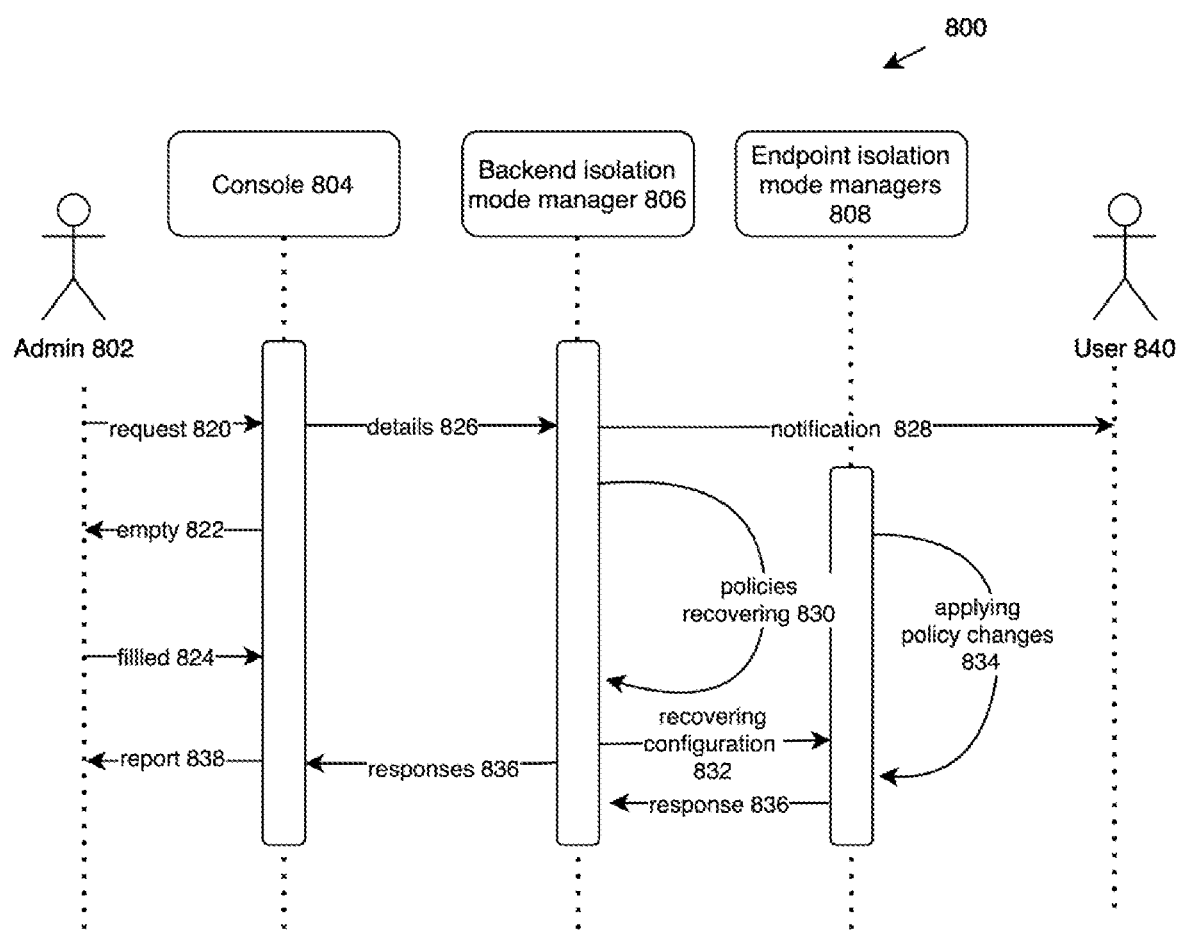
FIG. 8 shows an example of exiting from isolation mode.

FIG. 8 shows isolation mode exit 800 implemented by Admin 802 for User 840. The components used include console 804, backend isolation mode manager 806 and endpoint isolation mode managers 808. Admin 802 enters request 820 to exit isolation mode at console 804. Console 804 returns an empty exceptions description 822. Admin 802 enters filled exceptions description 824 (if any) and the isolation details 826 are conveyed to backend isolation mode manager 806, which in turn sends notification 828 to User 840 that isolation mode is being disabled. Backend isolation mode manager 806 recovers policies 830 and generates recovering configuration 832. Endpoint isolation mode managers 808 apply policy changes 834 locally and send responses and results to backend isolation mode manager 806. These responses are conveyed back to console 804 as processed responses and Admin 802 receives a corresponding report 838.

Figure 9:
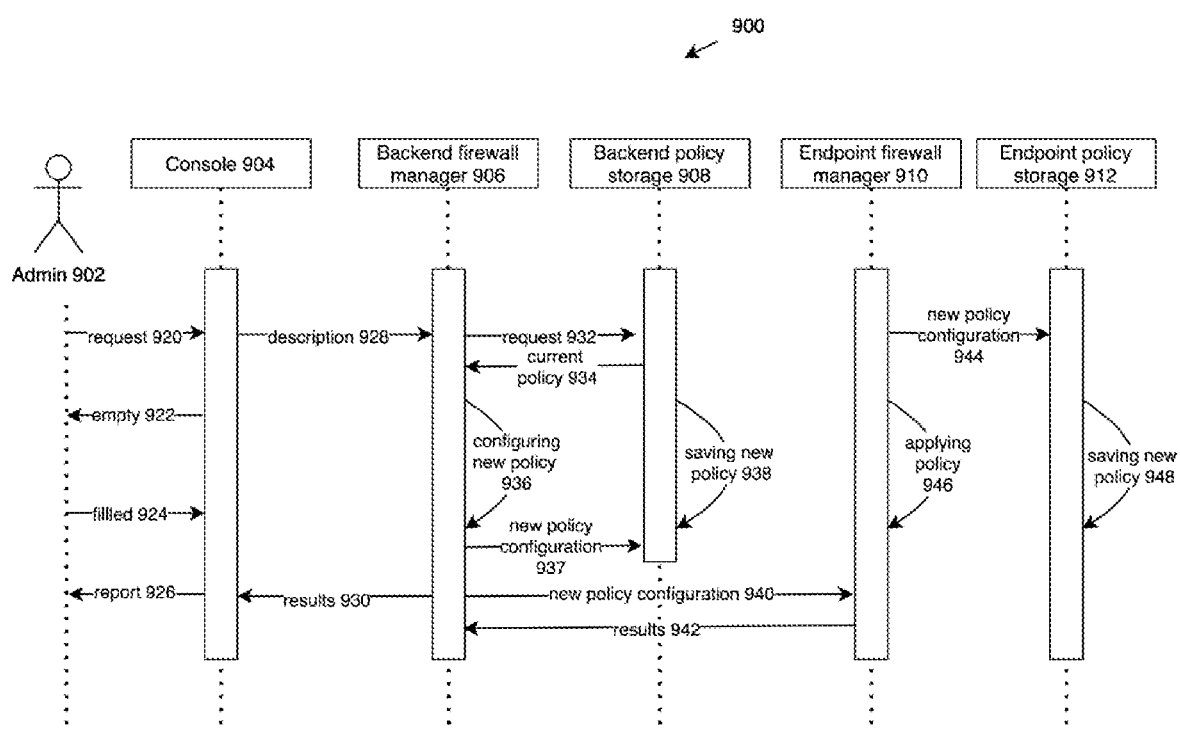
FIG. 9 shows an example of policy creation and change.

FIG. 9 shows an exemplary case of policy creation and change 900 by Admin 902. The components used include console 904, backend firewall manager 906, backend policy storage 908, endpoint firewall manager 910, and endpoint policy storage 912. Admin 902 enters a request 920 for policy creation or change at console 904. Console 904 returns an empty policy description 922. Admin 902 enters filled policy description 924. In an embodiment, policy description 924 is a wide policy description. Console 904 sends policy description 926 to backend firewall manager 906, which sends a request 928 for the saved policy to backend policy storage 908. Backend policy storage 908 responds by sending the current synchronized policy configuration 930. Backend firewall manager 906 takes the current policy configuration 930 and configures a new policy 932. Then backend firewall manager 906 sends the new configuration policy 934 to backend policy storage 908, which saves the policy as new policy 936. Backend firewall manager 906 also sends the new policy configuration 938 to endpoint firewall manager 910 where policy application 942 takes place. The new policy configuration 940 is sent to endpoint policy storage 912 where new policy 944 is saved.

Figure 10:
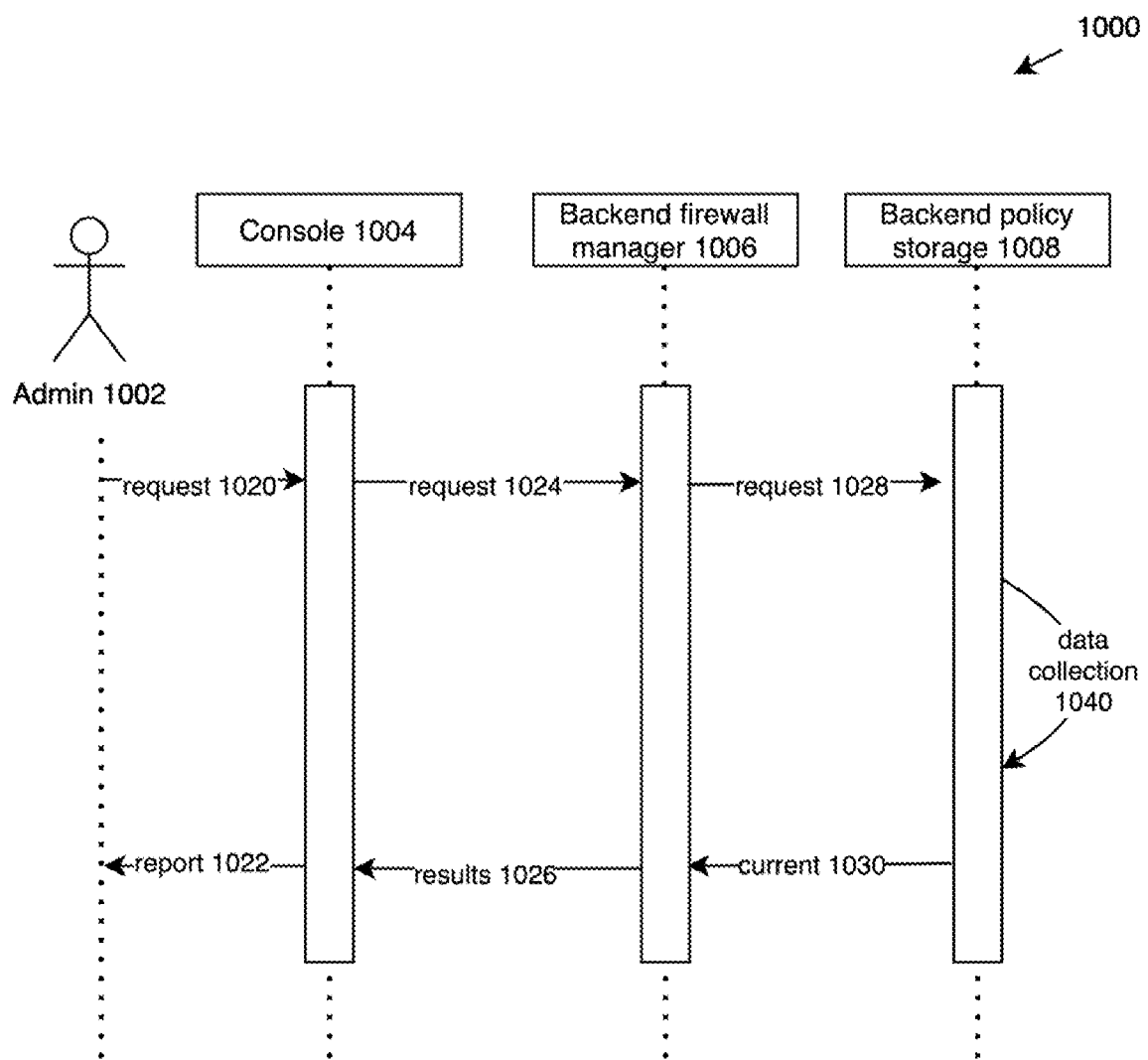
FIG. 10 shows an example of scanning for current firewall settings.

FIG. 10 shows procedure 1000 for scanning current firewall settings at the request of Admin 1002. Components used include console 1004, backend firewall manager 1006, and backend policy storage 1008. Admin 1002 requests scanning 1020 via console 1004. The scanning request 1022 is conveyed to backend firewall manager 1006. Backend firewall manager 1006 requests the last saved synchronization configuration from backend policy storage 1008. Data collection 1026 takes place and the current firewall configuration 1028 is conveyed to backend firewall manager 1006. This data is processed by the backend firewall manager and sent to console 1004 as processed results 1030 that are available to Admin 1002 in the form of report 1032.

Figure 11:
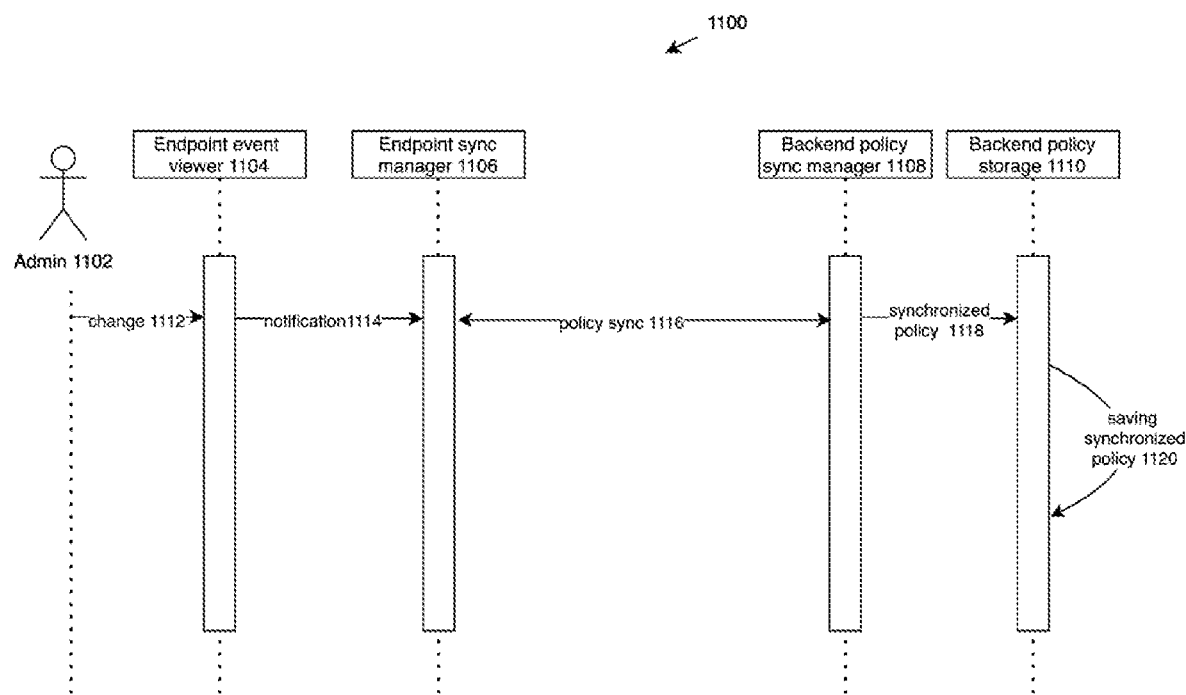
FIG. 11 shows an example of direct synchronization.

FIG. 11 shows an example 1100 of direct synchronization initiated by Admin 1102. Components used include endpoint event viewer 1104, endpoint sync manager 1106, backend policy sync manager 1110, and backend policy storage 1112. Admin 1102 initiates a change to endpoint firewall policy by sending change 1114 to endpoint event viewer 1104. In turn, endpoint event viewer 1104 sends a notification 1114 about policy changes to endpoint sync manager 1106. Policy synchronization 1116 takes place between endpoint sync manager 1106 and backend policy sync manager 1108. The synchronized policy 1118 is sent to backend policy storage 1110 where synchronized policy saving 1120 occurs.

Figure 12:
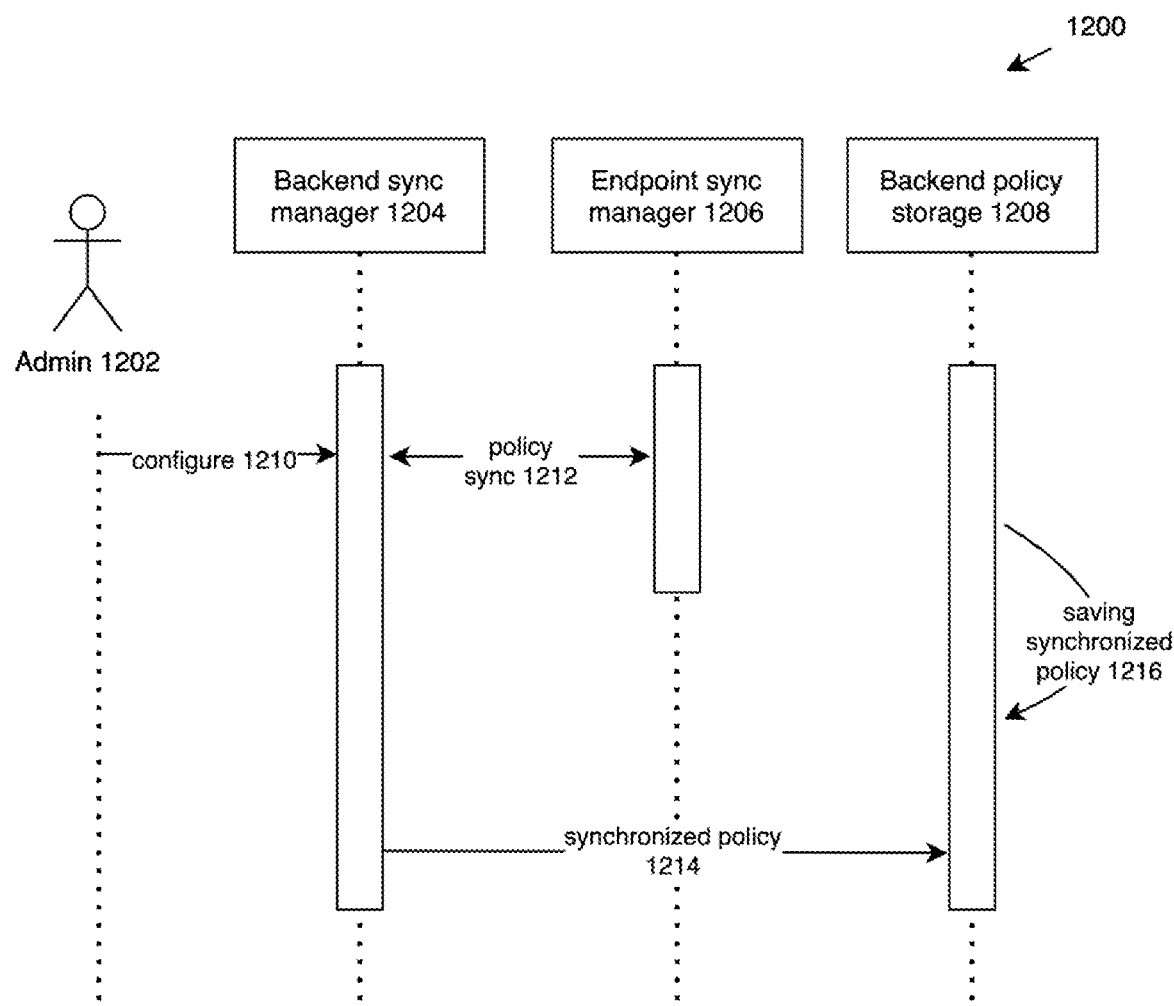
FIG. 12 shows an example of reverse synchronization.

FIG. 12 shows an example 1200 of reverse synchronization initiated by Admin 1202. Components used include backend sync manager 1204, endpoint sync manager 1206, and backend policy storage 1208. Admin 1202 configures a frequency 1210 of reverse policy sync via backend sync manager 1204. Policy synchronization 1212 takes place between backend sync manager 1204 and endpoint sync manager 1206. Backend sync manager sends synchronized policy 1214 to backend policy storage 1208 where synchronized policy saving 1216 occurs.

Figure 13:
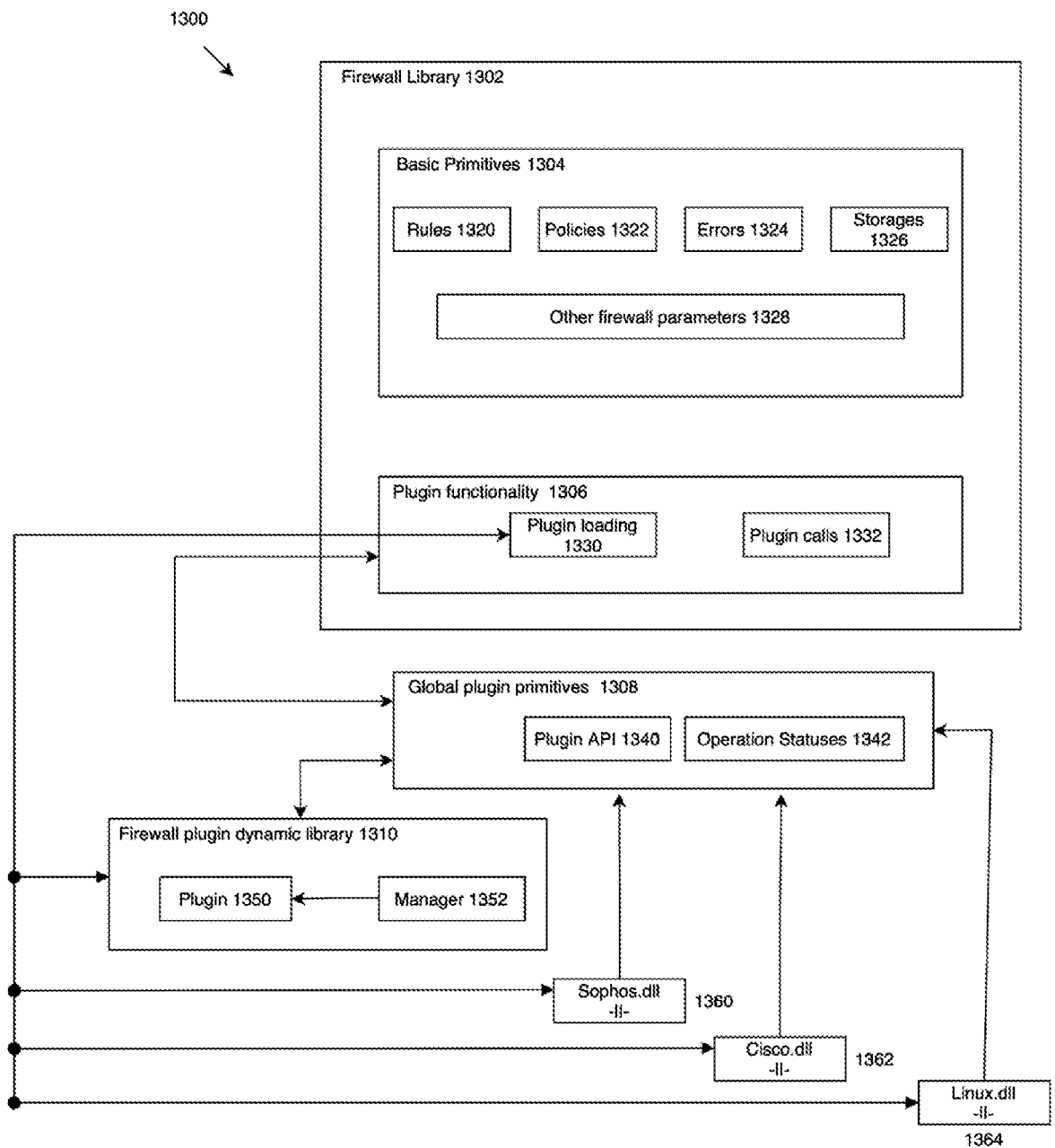
FIG. 13 shows an example of the global architecture used to implement the system.

FIG. 13 shows global architecture diagram 1300 with firewall library 1302 comprising basic primitives 1304 and plugin functionality 1306. Basic primitives 1304 include internal common representations of firewall settings. For example, there are rules 1320 (for all firewall types) and policies 1322 that describe rules for each firewall type to some extent. Functionality 1324 provides for unified error representation. There is also functionality 1326 for storing information, such as information in JSON format or in a database) and retrieving that information from storage. Basic primitives 1304 also comprises other firewall parameters 1328, either for all firewall types or unique firewalls.

Plugin functionality 1306 includes plugin loading 1330 and plugin calls 1332. Global plugin primitives 1308 comprises plugin API 1340 and operation statuses 1342. In communication with global plugin primitives 1308 is firewall plugin dynamic library 1310 comprising plugin 1350 and manager 1352. Also in communication with global plugin primitives 1308 and firewall plugin dynamic library 1310 are dynamic-link libraries (DLL), for example Sophos.dll 1360, Cisco.dd 1362, and Linux.dll 1364.

Plugin API 1340 is configured to provide a single interface for different plugins. Firewall plugin dynamic library 1310 can be accessed by plugin API 1340, as well as DLLs 1360, 1362, and 1364. Further, plugin API 1340 is also connected to firewall library 1302. Thus, plugin API 1340 provides the same functionality to manage different firewall types. For example, plugin API 1340 retrieves current plugin parameters such as dynamic plugin library names and version. Plugin API 1340 can also be used for initial firewall configuration, if a configuration file is required. Another API function is activating the process of firewall management, such as providing password, username, or other parameters; retrieving firewall settings or parameters such as rules, rules groups, policies. Further API functions include adding new firewall settings or parameters or making changes to existing rules. Finally, plugin API 1340 offers the ability to deactivate the process of firewall management.

Figure 14:
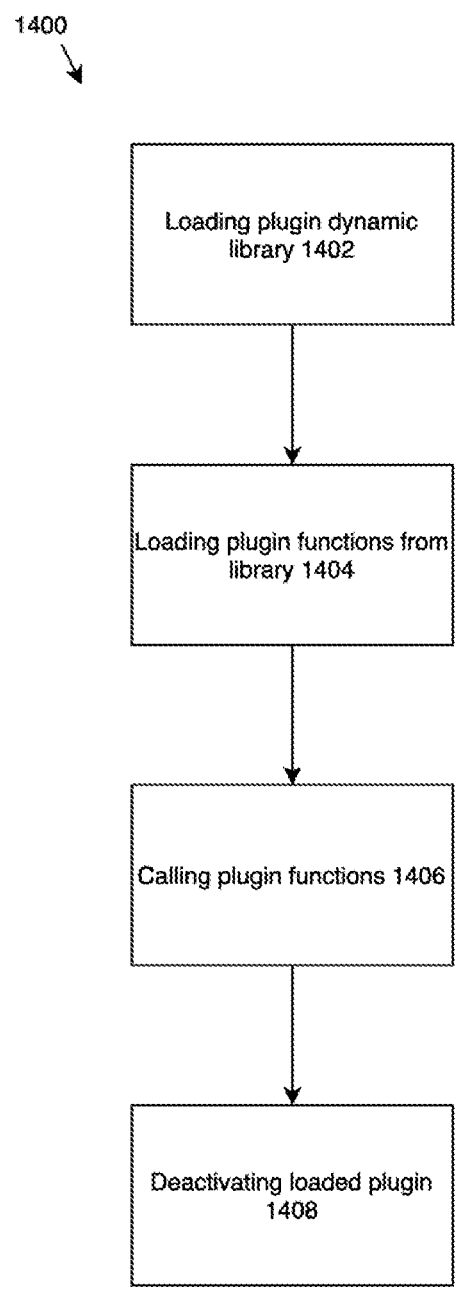
FIG. 14 shows an example of plugin functionality used in connection with the system.

FIG. 14 shows an overview 1400 of plugin functionality described as a sequence of steps. At the first step 1402, a dynamic plugin library is loaded from a given filepath. Then functions are exported from that library at step 1404. At step 1406, a user can call loaded plugin functions as needed. Finally, at step 1408 any loaded plugins may be deactivated.

Figure 15:
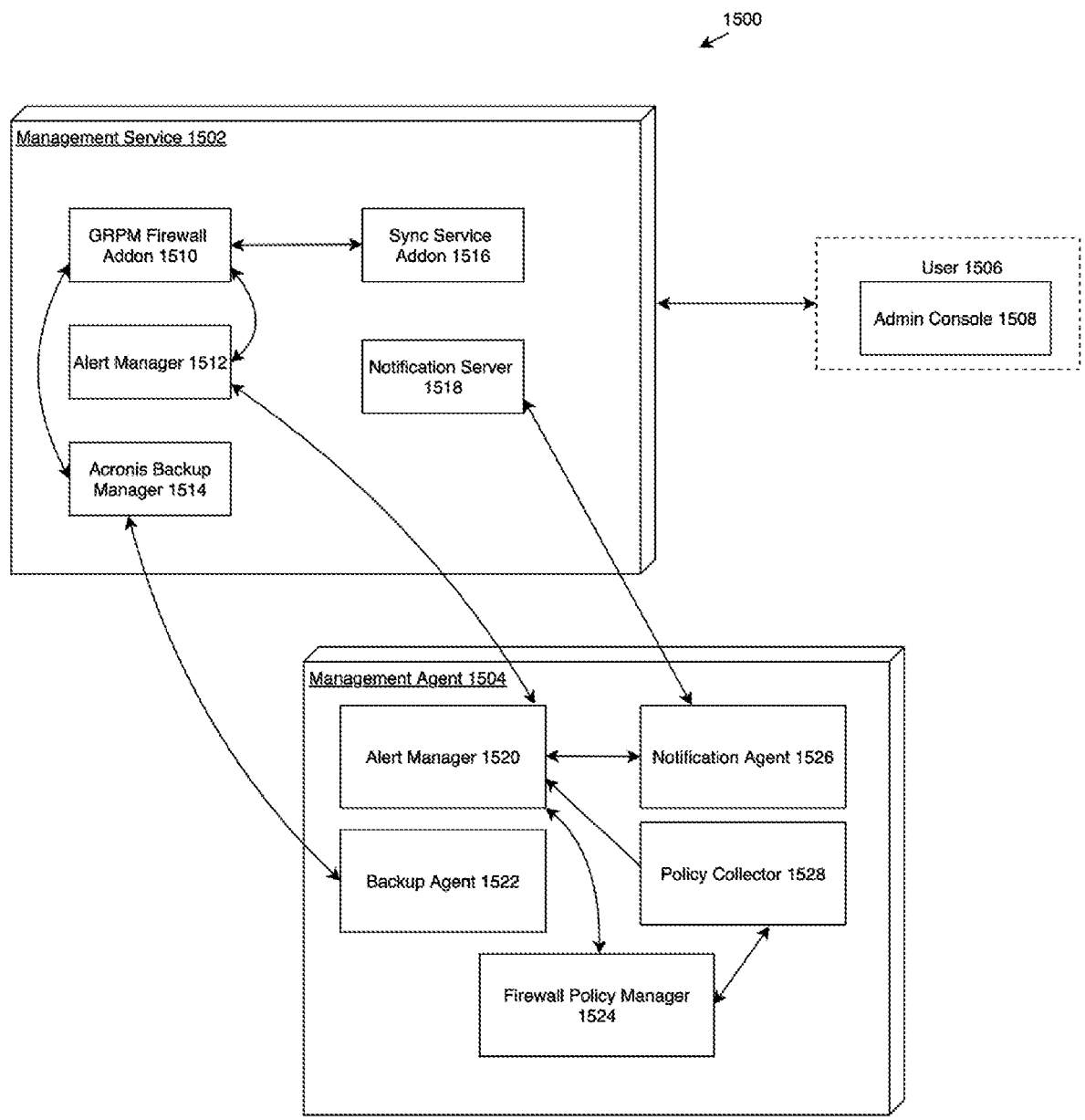
FIG. 15 shows additional functionality extensions for the system.

FIG. 15 shows an alternative configuration 1500 for management service 1502 and management agent 1504, where user 1506 has access via admin console 1508. The user 1504 may be a superuser, administrator, or other user with similar access privileges. Management service 1502 comprises general resource and policy manager (GRPM) addon 1510, alert manager 1512, backup manager 1514, sync service addon 1516, and notification server 1518. In an alternative embodiment, management service 1502 is a cloud-based service. Management agent 1504 comprises alert manager 1520, backup agent 1522, firewall policy manager 1524, notification agent 1526, and policy collector 1528.

In an embodiment, user 1506 finds out that a machine with a valuable network role, or with access to some sensitive information, is infected. User 1506 begins by interacting with admin console 1508 and opening a connection to management service 1502. User 1506 selects one or more machines for isolation and selects the type of isolation actions. In some types of isolation, backup manager 1514 (from the server side) and backup agent 1522 (from the agent side) also participate in the isolation process. User 1506 enables or disables an option, such as "show messages to end-user." User 1506 indicates a list, such as a list of exceptions to/from which connection should remain available in isolation mode. Examples of possible lists include ip-addresses, ports, host-names, or urls via dynamic IP-address scanning.

User 1506 launches the process of isolation of a network computer or machine when configured requirements are sent to the GRPM firewall addon 1510 (a specific handle) and are validated. GRPM Firewall Addon 1510 calculates the necessary isolation rules according to this algorithm and places the new rules in the database using sync service addon 1516, and initiates the disabling of group policy on the target endpoint. According to the synchronization algorithm, isolation policies are directly applied and the influence of group policies is disabled by firewall policy manager 1524. Synchronization is initiated between GRPM firewall addon 1510 and management agent 1504. Policy retrieval takes place on the agent side while sync occurs by way of policy collector 1528 and firewall policy manager 1524. GRPM firewall addon 1510 marks the machine as isolated and interfaces with notification modules for displaying information about the progress of isolation mode.

After the infected computer has been treated, user 1506 launches isolation mode disabling via admin console 1508. GRPM firewall addon 1510 calculates any isolation policy changes to be disabled, via interfacing with sync service addon 1516 fully restores machine policy. Available isolation mode actions comprise: isolate only, isolate and backup infected device, isolate and backup infected device with forensic data, and isolate and power off device. This functionality is supported by Notification Server 1518 and notification agent.

In an embodiment, multiple machines are isolated at the same time. In this embodiment, the set in the allowed list is the same for all machines. The allowed list is available to be changed or edited once the machine enters its isolated state, without exiting that isolated state. In an alternative embodiment, the computer to be isolated is not currently online. In this case, the isolation policy will be applied at the moment the connection is established. Isolation policy is a highest priority policy such that all other policies that conflict with isolation policy are prohibited.

In an embodiment, alerts will be shown if the machine fails to enter isolation mode. Alert messages are processed by alert manager 1520 shown to the user 1506 via notification systems. For example, If user 1506 enables «show messages to endpoint user» alerts and messages about isolation mode enabling progress will be also displayed via alert manager 1520 on the agent side. Alerts will be shown if the machine fails to exit isolation mode. In a further embodiment, some alert messages will be processed by alert manager 1512 and shown at admin console 1508 by notification systems.

In an embodiment, the components in FIG. 15 are used for policy control comprising creation or change current policy on endpoint, making new rules, changing firewall settings, and default actions.

Admin console 1508 is used to define a wide policy structure of a policy for chosen type of supported firewall, such as Windows, Linux, Sophos, Cisco, or others. The new policy is delivered to GRPM firewall addon 1510, which validates the policy. GRPM firewall addon retrieves current policy using sync service addon 1516 and adds, changes, deletes new or old rules and settings to and from databases. According to the synchronization algorithm, at the time of initialization of synchronization between GRPM firewall addon 1510 and firewall policy manager 1524 (assuming the managed computer is on the network), new policies are directly applied by firewall policy manager 1524. This step depends on the type of firewall to be managed. For example, corporate firewall supports only a narrower part of the wide policy description. The policy is updated when synchronized with the help of policy collector 1528 and firewall policy manager 1524 on the agent side. Policy conflicts are resolved according to the policy priority. Alerts showing conflict details are handled by Alert Manager 1512.

In an embodiment, the library supports some wide description of a policy, such as rules, user groups, groups of rules, or default actions, that can be configured and applied for a given endpoint. Policies are defined based on parameter selection.

If a more strict policy is requested and a corporate firewall cannot support the policy, GRPM firewall addon 1510 provides this functionality by involving other default managed firewall types that work on the software level. In an embodiment, old parts of a policy are changed and saved to the database or deleted from the database. Or polices are renewed when new parts of policy are saved to the database.

In an embodiment with corporative firewalls, only narrower policy is deployed where some items of the wide policy are not available. Alternatively, for software level firewalls a wide structure of policy is implemented. Wide structure of a policy is defined with user-level or user-group-level restrictions for a chosen type of supported firewall such as Windows, Linux, Sophos, Cisco or others. GRPM firewall addon 1510 performs policy validation. GRPM firewall addon 1510 retrieves current policy using sync service addon 1516 and adds, changes, or deletes new or old rules and settings to and from the database and associates the changes with a user group or user. According to the synchronization algorithm, at the time of initialization of synchronization between GRPM firewall addon 1510 and firewall policy manager 1524, new policies are directly applied by firewall policy manager 1524. This step depends on the type of firewall to be managed. Updating policy occurs during sync with the help of policy collector 1528 and firewall policy manager on the agent side. Policy conflicts are resolved according to the policy priority. Alerts with conflict details are sent by alert manager 1520.

In an embodiment, a managed firewall does not currently support policies for users or groups of users. In this case, policies for specific users and groups of users are stored and loaded after user activation. Management agent 1504 and a local database perform these steps.

For providing functionality of resolving urls and hostnames while a machine is in an uninfected state, the backend receives a list of DNS-servers. The backend stores them in a database such as "known IP-addresses of DNS-servers." The backend checks a provided list of DNS-servers. A given server is considered as trusted if it is a local Windows Active Directory DNS-server or public server that supports DNSSEC. In an embodiment, DNS-servers that were characterized as trusted during the discovery process will be used for resolving urls and hostnames.

DNS-servers IP-addresses are configured for further usage in resolving urls and hostnames during isolation mode. If a DNS server is not trusted, then the corresponding alert message will be displayed at Admin console 1508. The interaction will be carried out as with a trusted DNS-server if the user 1506 authorizes it. The backend sends to management agent 1504 a list of IP-addresses of trusted DNS-servers, and a list of urls and hostnames, which should be resolved into a list of IP-addresses. Management agent 1504 accesses the corresponding DNS-servers and sends received IP-addresses (resolved urls and hostnames) to the backend. The backend builds exceptions for received IP-addresses according to the algorithm. When entering isolation mode, more items may be needed than are in the administrator's "allowed list" and ports and IP-addresses for interacting with the backend. These include ports and IP addresses for DNS-Servers. In accordance with this policy, there are two main ways in updating dynamic IP-addresses. First, management agent 1520 detects some events from the DNS-client. In this case the agent 1520 sends the backend some "refreshing ping request" and the step b is starting. Second, the backend sends a verification request to agent 1504 to verify the relevance of the urls and hostnames match to the list of IP-addresses. This step can be performed either independently or as a consequence of the first way. In an alternative embodiment, before the second way user 1506 changes a list of trusted DNS-servers on the backend side. Then refreshed isolation rules are sent to management agent 1504. Preferably, this is done so that the isolated machine can access the new DNS-servers. The management agent 1504 passes the received updates of IP-addresses to the backend, which checks them against the existing rules and replaces them if changes have been made. New isolation rules with changes are sent to agent 1504 and the modified isolation rules are applied to the agent 1504.

In an embodiment, dynamic IP-addresses policy is updated. For example, Event Tracing for Windows (ETW) running on management agent 1504 detects appropriate events from Microsoft-Windows-DNS-Client provider. In this case, agent 1504 initiates updating of IP-addresses that correspond to some urls or hostnames in the isolation policy. In accordance with specified configurable time intervals, such as 10 minutes, agent 1504 initializes the update of appropriate IP-addresses. The administrator can use the admin console to force the update of the dynamic IP-addresses on the selected endpoint. In this case, the backend forces agent 1504 to initiate the updating of IP-addresses that correspond to some urls or hostnames in the isolation policy.

For implementation of isolation mode, all machines in the managed network should support the ability to be isolated. Currently, these requirements can be met by a machine running the Microsoft Windows operating system. Also required is an appropriate policy, for example, policy.machine.network_isolation in JSON format:

```
{
    "immediate_action" : "isolate_only",
    "display_message_to_end_user": true,
    "allowed_ports": [ ],
    "allowed_urls": [ ],
    "allowed_ips/hostnames" : [ ],
}
```

Where, "immediate action" can store the following values: isolate only; isolate and backup infected device; isolate and backup infected device with forensic data; and isolate and power off device. An allowed property should contain values corresponding to its name with an indication of the traffic direction, whether inbound, outbound, or both inbound and outbound (default).

An Isolation Network Addon will be registered by calling POST on GRPM/addons endpoint (POST/api/resource_and_policy_addons/v1/addons) with content describing policy and resource traits. According to GRPM addon Rest API, Network Isolation Addon should help GRPM in resource validation discovery and policy validation. Newly discovered resource types need to be validated when, for example, new machines join the network. Policy validation is implemented by "/validator", which validates the policy structure configured by the administrator according to a specified allowed list. Policy validation is also implemented by "/applicability endpoints," which is a check that the policy can be applied to the resource, for example, a machine running the Windows operating system. The policy deployment role is implemented by "/deployment endpoint" because Network Isolation should have a custom execution. Because Network Isolation policy assumes non-continuous execution, this role is implemented by "/run endpoint".

Figure 16:
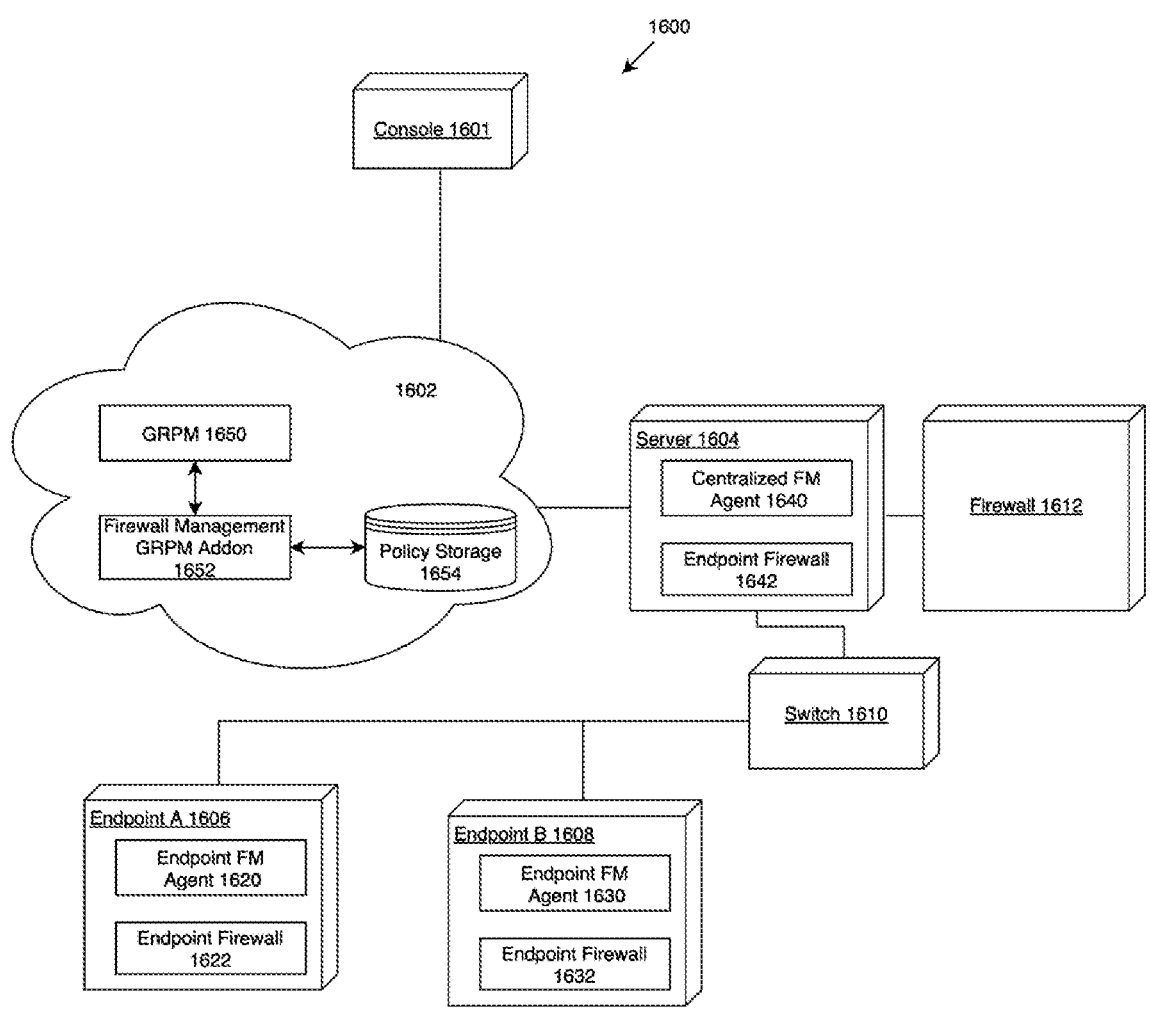
FIG. 16 shows an alternative architecture with a GPRM Addon.

FIG. 16 shows an embodiment 1600 with the GRPM add-on feature described in connection with FIG. 15. In an embodiment, a mandatory hook interface is used and access is controlled. For example, a GRPM superuser with special permissions can be given sole authority to use the mandatory hook interface via console 1601, which is in communication with a cloud-based service 1602. Under management are server 1604, two endpoints 1606 and 1608, connected by switch 1610. In an embodiment, firewall 1612 refers to a corporate firewall protecting other network resources behind it.

Endpoints 1606 and 1608 include endpoint firewall management agents 1620 and 1630 and endpoint firewalls 1622 and 1632. Server 1604 includes centralized firewall management agent 1640 and endpoint firewall 1642.

Cloud-based service 1602 comprises GRPM 1650, firewall management GRPM addon 1652, and policy storage 1654 in communication with GRPM addon 1652.

The system and methods described above are implemented in a corporate computer network environment. Corporate in the context of the invention refers to the use of managed endpoints and a centralized management server. Such configurations may be implemented by commercial, non-profit, and governmental organizations.

The invention claimed is:

1. A system for isolating machines in a computer network with a plurality of endpoints, comprising:
a centralized server comprising a processor and nonvolatile storage and configured for hosting a firewall management service;
one or more firewall management agents installed on endpoints under management, the endpoints comprising machines, remote from the centralized server, with processors and nonvolatile storage, and coupled to a firewall management agent;
wherein the firewall management service is configured to deploy isolation mode for at least one endpoint and to manage endpoint firewall policies;
wherein the firewall management agents are configured for deploying endpoint firewall policies;
wherein the firewall management service is configured for modifying, adding, or deleting endpoint firewall policies; and
wherein, when endpoint firewall policies are synced with firewall management service policies and a conflict results, the firewall management service's policy has priority if the policy conflict results from a policy change made by an endpoint administrator; and
wherein if the policy conflict results from a change made by the firewall management service, the policy change is disabled by the firewall management service.

2. The system of claim 1, wherein the firewall management service and one or more firewall management agents perform direct policy synchronization between the firewall management service and one or more firewall management agents.

3. The system of claim 2, wherein the firewall management service includes a hierarchy of firewall policies wherein the firewall policies comprise a plurality of rules.

4. The system of claim 3, wherein the endpoints include software with firewall policies and the firewall policies applied to the software are wider than the policies that apply at the network level.

5. The system of claim 3, wherein isolation mode rules block all network traffic to and from an endpoint but isolation mode rules are configured to exclude one or more services from the barrier on incoming and outgoing network traffic.

6. The system of claim 5, wherein in the hierarchy of firewall policies, the isolation policy is the highest priority policy.

7. The system of claim 6, wherein current firewall policies are converted to unified policy representation format.

8. The system of claim 6, wherein the firewall management service is configured to perform a dynamic scan of IP addresses.

9. A method of isolating endpoints in a computer network with a firewall management service hosted on a central server comprising a processor and nonvolatile storage and one or more firewall management agents installed on one or more machines at the endpoints, comprising the steps of:
identifying an endpoint infected with a malware;
configuring firewall policies for the endpoint that allow access to the machine by specified services;
cleaning the isolated machine of the malware; and
restoring network firewall rules for the isolated machine, wherein the firewall management service is configured for modifying, adding, or deleting the endpoint firewall policies; and
wherein, a determination is made that the endpoint firewall policies are synced with firewall management service policies and a conflict results and the firewall management service's policy has priority if the policy conflict results from a policy change made by an endpoint administrator; and
wherein if the policy conflict results from a change made by the firewall management service, the policy change is disabled by the firewall management service.

10. The method of claim 9, further comprising the step of direct policy synchronization by the firewall management service and one or more firewall management agents.

11. The method of claim 10, further comprising the step of synchronizing firewall policies with reference to a hierarchy of firewall policies, wherein the firewall policies comprises a plurality of rules.

12. The method of claim 11, wherein the endpoints include software with firewall policies and further comprising the step of configuring firewall policies applied to the software are wider than the policies that apply at the network level.

13. The method of claim 12, further comprising the step of allowing access by one or more services to the machine that would otherwise be blocked according to firewall policies controlling incoming and outgoing network traffic.

14. The method of claim 13, wherein in the hierarchy of firewall policies, the isolation policy is the highest priority policy.

15. The method of claim 11, further comprising the step of converting current firewall policies to unified policy representation format.

16. The method of claim 11, further comprising the step of performing a dynamic scan of IP addresses via the firewall management service.

17. The method of claim 11 where the machine is a server.

* * * * *